United States Patent
Anderson et al.

(10) Patent No.: US 8,117,422 B2
(45) Date of Patent: Feb. 14, 2012

(54) FAST ADDRESS TRANSLATION FOR LINEAR AND CIRCULAR MODES

(75) Inventors: Timothy D. Anderson, Dallas, TX (US); Kai Chirca, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 422 days.

(21) Appl. No.: 12/366,061

(22) Filed: Feb. 5, 2009

(65) Prior Publication Data

US 2010/0199064 A1    Aug. 5, 2010

(51) Int. Cl.
*G06F 12/00* (2006.01)
*G06F 7/50* (2006.01)

(52) U.S. Cl. .................. 711/207; 708/671; 708/709
(58) Field of Classification Search .............. None
See application file for complete search history.

(56) References Cited

U.S. PATENT DOCUMENTS

2003/0110198 A1 * 6/2003 Park .................. 708/671
* cited by examiner

*Primary Examiner* — Reginald Bragdon
*Assistant Examiner* — Stella Eun
(74) *Attorney, Agent, or Firm* — Robert D. Marshall, Jr.; W. James Brady; Frederick J. Telecky, Jr.

(57) ABSTRACT

The core of this invention is the application of a fast comparison circuit to the problem of address translation. Traditional implementations generate the virtual address and the physical address in series. This invention generates the physical address and virtual address simultaneously. A bitwise operation on the base address, the offset address and each stored virtual address determines whether the base address and offset address sum equals the virtual address without requiring a carry propagate. Circular addressing is implemented in the match determination by masking bits corresponding to the circular address limit.

5 Claims, 8 Drawing Sheets

FAST ADDRESS TRANSLATION FOR LINEAR AND CIRCULAR MODES

TECHNICAL FIELD OF THE INVENTION

The technical field of this invention is address generators.

BACKGROUND OF THE INVENTION

In typical microprocessor programs, addresses are defined in terms of a base address and an offset address. The base address is the starting point for a block of data that the program uses and the offset address is the displacement of a specific data word from that base address. This allows programs to be generally applicable without regard to which portions of the physical memory are occupied with stored data. Thus a given memory fetch in a program is carried out using a virtual address made up of the base address plus an offset address. The process of generating a real physical address to memory corresponding to a given virtual address is referred to as address translation.

In current digital signal processors virtual memory address generation includes a two-step process: the addition of two 32-bit numbers, the base address and the address offset; and a step of ensuring that the calculated address stays within the range of a circular address buffer of designated size. The final result of that two-step operation is known as the virtual address. The traditional way of performing address translation yielding a real physical address is to first generate the virtual address, and then to perform an address translation step.

Figure 1:
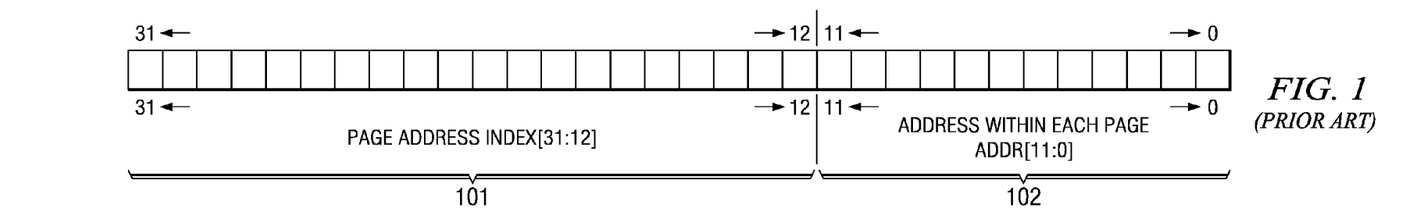
FIG. 1 illustrates a simple virtual address and physical address format for a current DSP processor (Prior Art)

To describe the actual address manipulation included in virtual address generation and address translation, it is useful to start with an example system. Assume that the physical memory is made up of pages, each page containing 4 KB memory space. Address mapping is applied to the 20 MB of the virtual address to generate the 20-bit physical page address index. FIG. 1 illustrates a simple memory table format. Page address index address 101 includes bits 31 to 12. Page address 102 the address within a given page includes bits 11 to 0.

Figure 2:
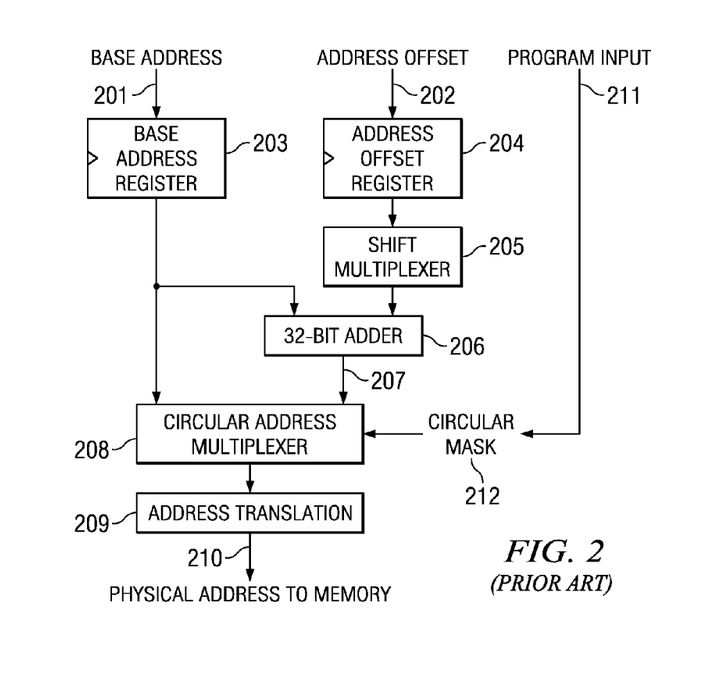
FIG. 2 illustrates the basic elements of an arithmetic functional unit in a current DSP processor (Prior Art)

In current TI TMS320C6000 DSPs the D unit includes a full complement of hardware functions for addition, shifting, multiplexing and other processes involved in address generation and translation. FIG. 2 illustrates the D unit functionality for address translation. The D unit takes two source inputs, base address 201 stored in the base address register 203 and address offset 202 stored in the address offset register 204. The shift multiplexer 205 executes any required address shifts in the offset address. The D unit performs the 32-Bit add function in block 206 calculating the virtual address 207 based on the addressing mode. The remaining processing for address translation must be able to generate a virtual address in one of three possible addressing modes. The first mode is linear addressing; the remaining two modes comprehend two cases of circular addressing. Multiplexer 208 handles the masking required in the two circular modes utilizing a circular mask 212, which comes from program input 211. Following this masking step, the virtual address 207 is subjected to a comparison step in address translation block 209 to determine the physical address to memory 210.

The conventional solution for memory translation, illustrated in FIG. 2 takes these three cases into account but adds extra delay for the extra functions. After calculation of the virtual address, a table lookup/item comparison has to be applied in address translation block 209 to complete the physical address translation. The address calculation and translation implemented in this manner takes more than 20 levels of logic and cannot be accomplished in one clock cycle of a GHz CPU.

In addition to straightforward linear addressing, current DSP architectures define a circular addressing mode. As noted above, we assume that the physical memory is made up of pages, each page containing 4 KB memory space. Address mapping is applied to the 20 MSB of the virtual address to generate the 20-bit physical page address index.

Figure 3:
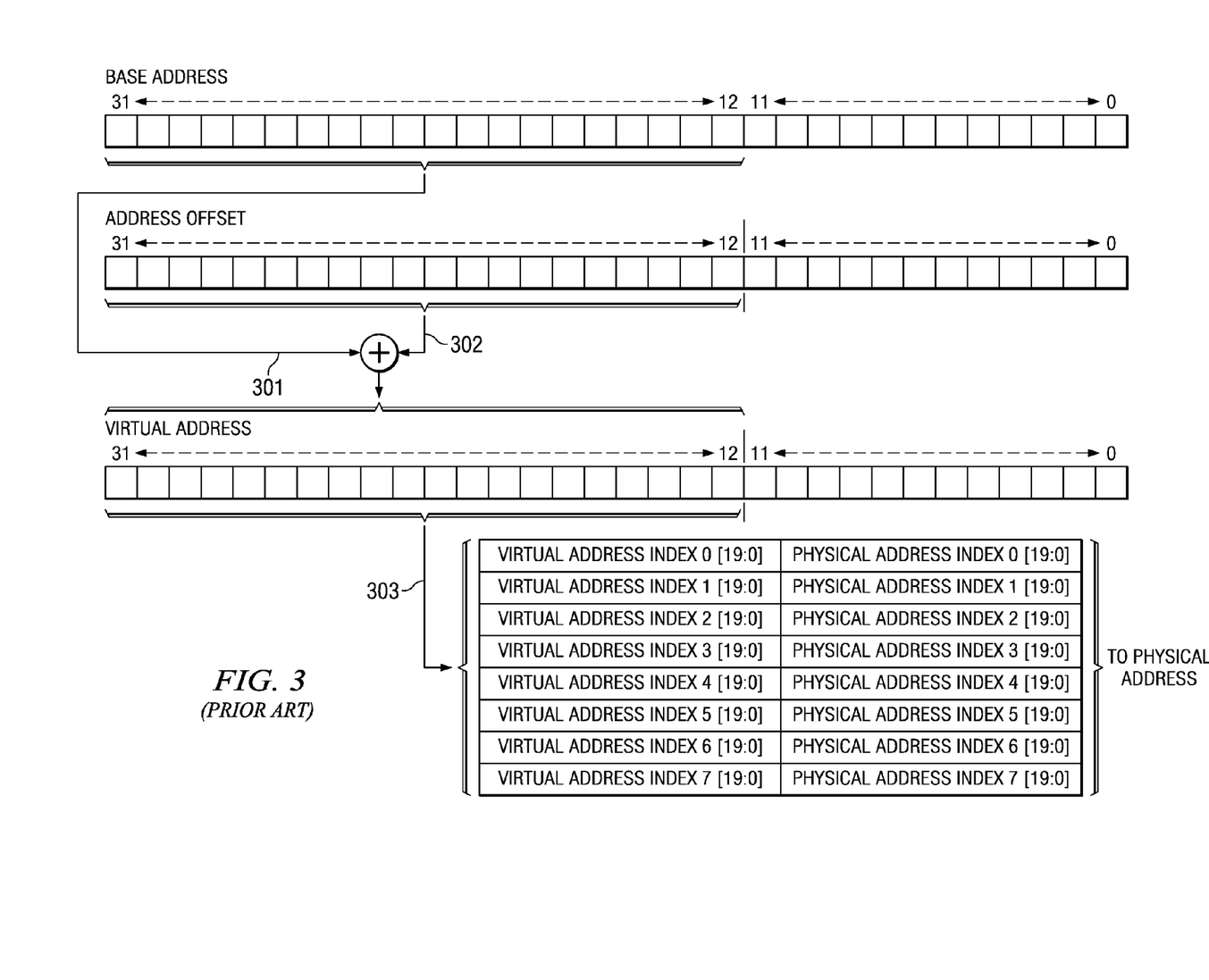
FIG. 3 illustrates the address translation algorithm for linear mode (Prior Art)

Linear addressing is illustrated in FIG. 3. A virtual address index may be computed as the sum 303 of base address 301 and address offset 302. Further, as illustrated in FIG. 3, it is possible to construct a look-up table translating a specific virtual address (given in FIG. 3 as virtual address indices 0 to 7) to a corresponding physical address index. The traditional way of performing address translation is to generate the virtual address, and then to perform additional steps based on this virtual address. This multi-step process causes the overall address translation process to have severe speed limitations. Additional complications arise when circular address translation having added special cases must be comprehended.

SUMMARY OF THE INVENTION

This invention is application of a fast comparison circuit to the problem of address translation. Traditional load/store pipeline implementations take more than one clock cycle to perform the steps of address generation and or address translation. The present invention provides an efficient solution involving a micro-translation look-aside buffer (TLB). The TLB is inserted into an arithmetic functional unit of the CPU datapath. This D unit is the functional unit dedicated for 32-bit add, subtract, linear and circular address calculation. The invention performs the address translation step in parallel with the virtual address generation step, thereby reducing the total number of clock cycles required to perform a memory operation. Current load/store pipeline requires a fixed number of clock cycles, so this invention enables the use of address translation into current architectures in a straightforward manner.

BRIEF DESCRIPTION OF THE DRAWINGS

These and other aspects of this invention are illustrated in the drawings, in which.

DETAILED DESCRIPTION OF PREFERRED EMBODIMENTS

A portion of the method of computing address translation in linear mode, illustrated above in FIG. 3 for prior art, can be extended for use in the present invention. The extension involves generating the virtual address indices from the base address and address offset directly. Knowing only the base address and the address offset, and not the computed sum, allows the look-up table to be constructed by the address translation program, a feature that is utilized by the invention. This look-up table makes it possible to start computation of the translated address without first having to use clock cycles to generate the virtual address sum. The computation of the translated address involves only the selection of a specific qualifying virtual address index according to selection rules which are defined below by applying a fast compare to the possible virtual address indices.

In a given circular addressing mode two parameters are of interest: (a) circular buffer size and (b) page size. A circular buffer is defined as a 2N byte region of memory aligned to a 2N byte boundary and the specific parameters for the circular buffer are determined by the DSP based on program input. When using circular addressing mode, the sum of base address and address offset may wrap across an encountered page boundary to ensure the sum stays in the defined region of memory.

Figure 4:
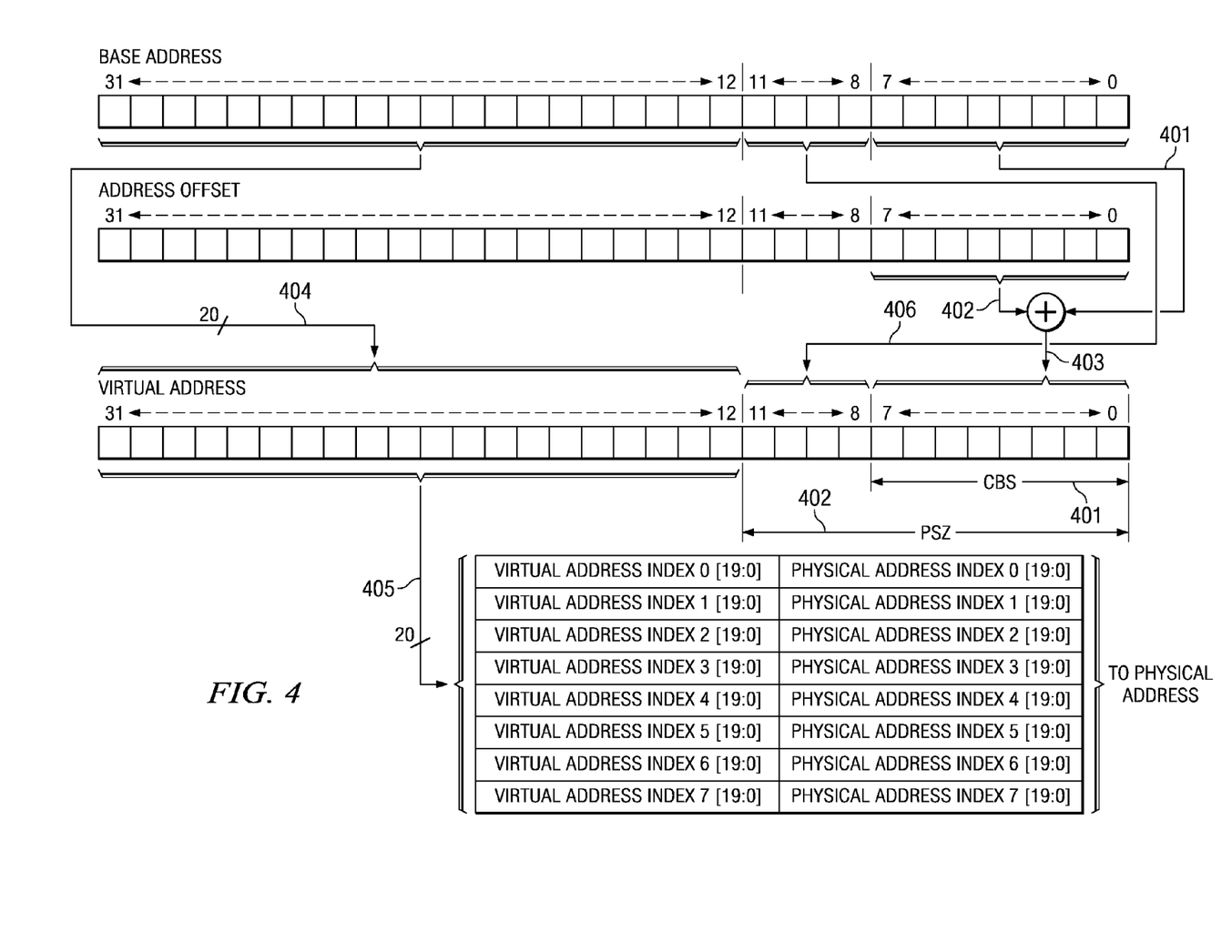
FIG. 4 illustrates the algorithm for circular mode address translation when circular buffer size is smaller than page size.
Figure 5:
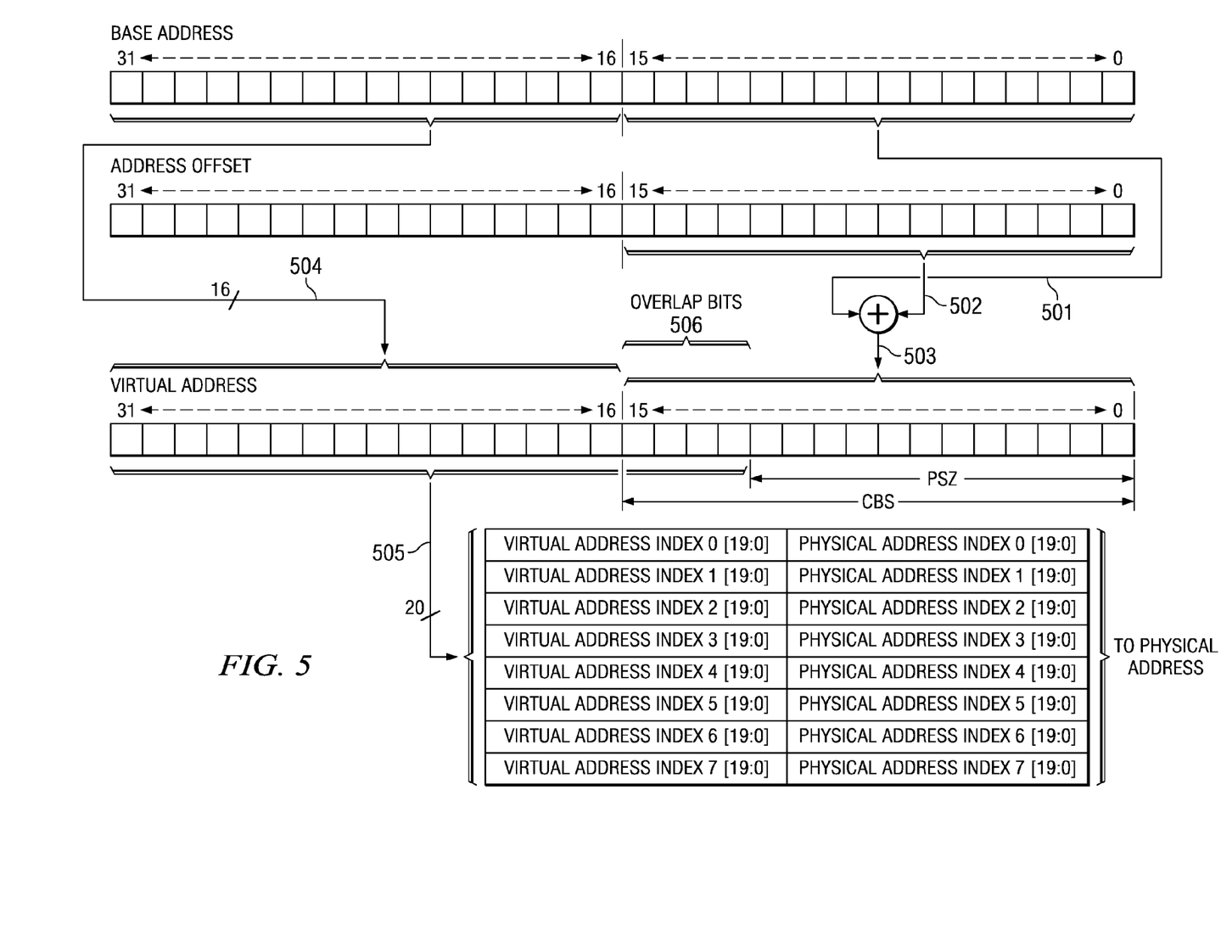
FIG. 5 illustrates the algorithm for circular mode address translation when circular buffer size is larger than page size.

FIG. 4 illustrates the case in which circular buffer size (CBS) 401 smaller than page size (PSZ) 402. FIG. 5 illustrates the case in which circular buffer size (CBS) 501 is larger than page size (PSZ) 502.

In FIG. 4, with CBS<PSZ, all addresses in one circular buffer will stay in the same page. The circular address buffer stores the sum of base address bits [7:0] 401 and address offset bits [7:0] 402. Circular buffer bits [11:8] contain a copy of base address bits [11:8] 406. The base address 404 alone will be used for calculation of the virtual address index 405. In this case, the address offset may affect only the value up to the lower 12-bits of the address.

In FIG. 5, with CBS>PSZ, addresses in the circular buffer may cross a page boundary. The circular address buffer stores the sum of base address bits [15:0] 501 and address offset bits [15:0] 502. Circular address buffer bits [15:12] contain the overflow from the sum 503, that portion crossing the page boundary. The virtual address index 505 is derived from the sum of base address bits [31:16] 504 and virtual address bits [31:16] extended by the overlap bits of the virtual address [15:12] 506.

In the present invention the process of generating address translation, instead of comparing the calculated virtual address with the table items to generate the corresponding physical address, the address mapping is done without the complete addition of the two input addresses. For the different addressing modes, the address mask is used to select between comparison results with the base address only and the comparison results with base and offset addresses.

Figure 6:
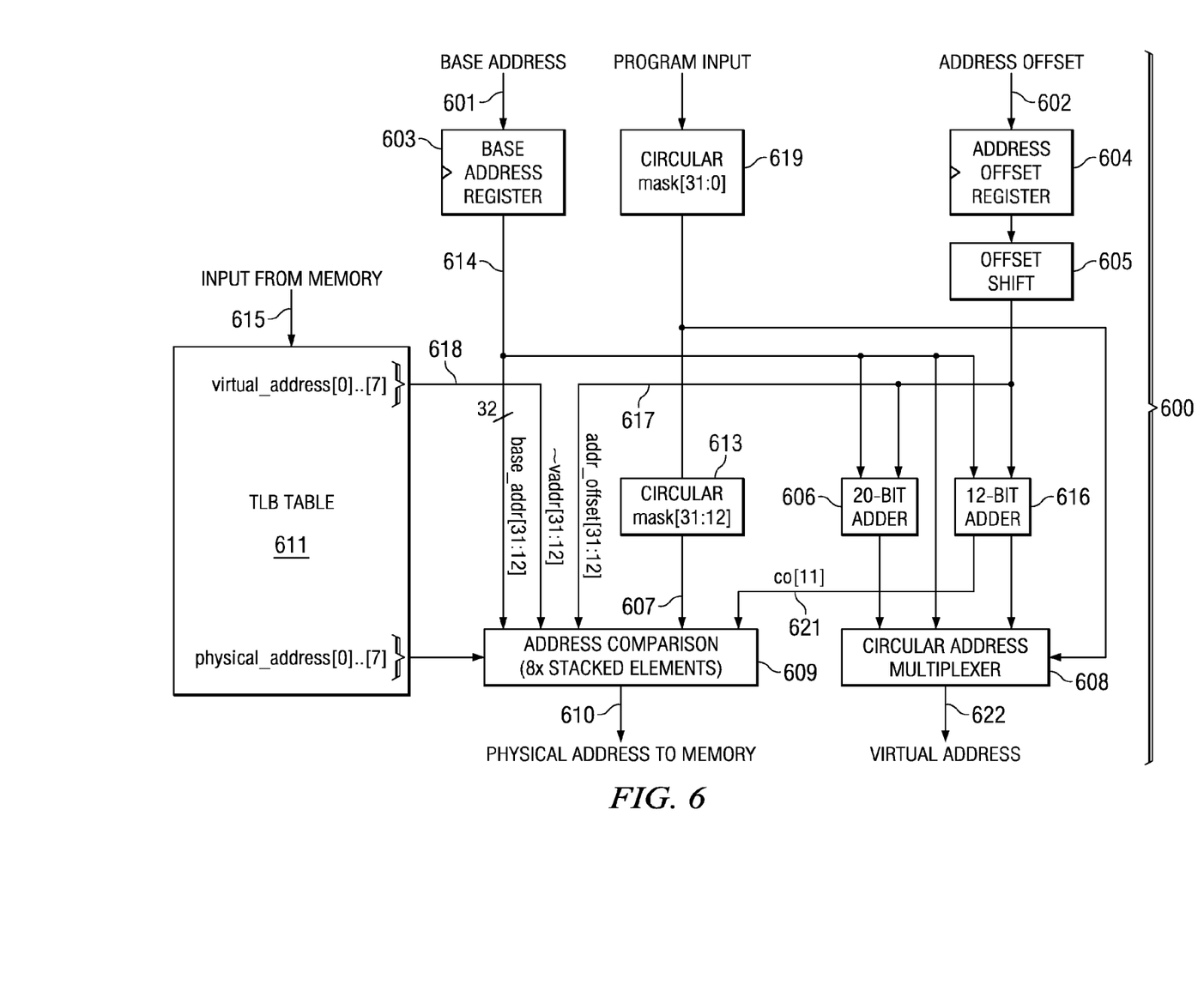
FIG. 6 illustrates a modified arithmetic functional unit providing for the merging the address calculation and address translation.

FIG. 6 illustrates a diagram of the D Unit of this invention merging the address calculation and translation; the address path 600 can fit into one clock cycle of a 1 GHz CPU. Program input to circular mask 619 determines the circular buffer size. Addr_offset 602 enters via address offset register 604 and offset shift block 605. Base address 601 enters via base register block 603. The 32-bit adder of the D unit is reconfigured here to perform two addition operations: (a) a 20-bit addition of base address[31:12] and address offset[31:12] in block 606 and (b) a 12-bit addition of base address[11:0] 614 and address offset[11:0] 616 in block 616 with carry out co[11] 621. The TLB table 611 is loaded via path 615 and contains 8 entries in this implementation. Base address 614 and address offset 617 are used directly for linear address mapping. The address comparison block 609 performs the fast compare based on five input signals: (1) base_addr[31:12] 614; (2) the ones complement of vaddr[31:12] (~vaddr[31:12]) 618; (3) addr_offset[31:12] 617; (4) co[11] 621; and (5) circ_mask [31:12] 607 used for circular mode addressing. Circ_mask [31:12] includes a set of least significant 1 bits defining the circular address range with the most significant bits above the circular address range being 0's. Circ_mask[31:12] limits the addition of the base address and the offset address to the circular address range. Note that if the sum of the base address and the offset address exceeds the circular address range, then the calculated address wraps back into the circular address range. Thus offset address bits beyond the circular address range do not form any part of the calculated address. Address comparator 609 generates physical address 610 supplied to memory. Circular address multiplexer 608 generates virtual address 622.

Figure 7:
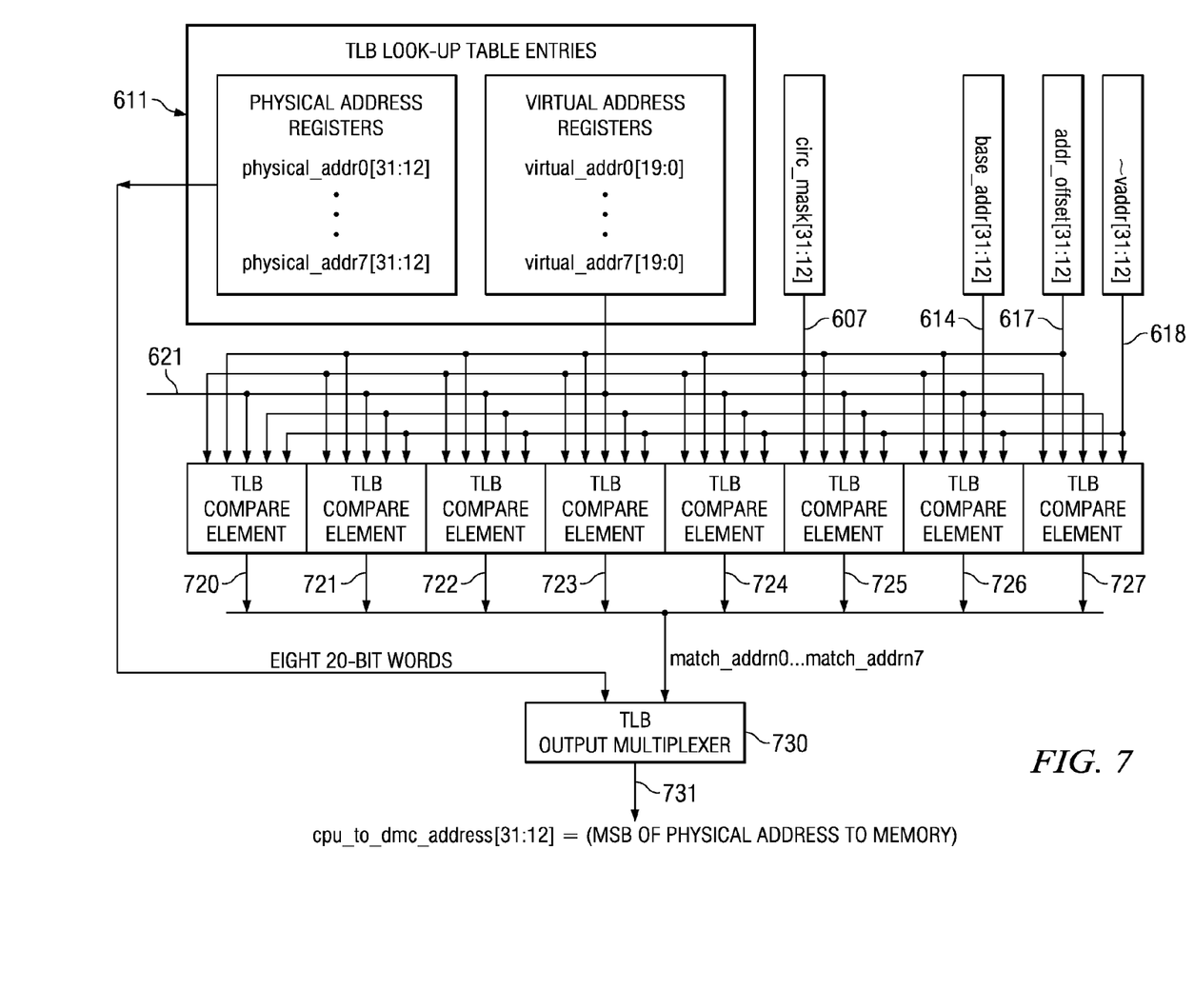
FIG. 7 illustrates the functional blocks used to implement a fast compare in the modified arithmetic functional unit of FIG. 6.

FIG. 7 illustrates the diagram of comparison blocks 609 and TLB table 611 of FIG. 6. The base address 614 and address offset 617 are both used along with circ_mask[31:12] 607, ~vaddr[31:12] 618 and co[11] 621 to do the table comparison against the stored virtual address entries. Only one entry in the table will be a match. A matching entry returns the corresponding match_addrn signal on (720 through 727). This signal is used to pick the corresponding physical address. The lower 12 bits are addresses inside the selected pages. They are generated by the normal address calculation. TLB output multiplexer 730 provides output via 731.

The comparison seeks a match for the condition:

$$A[31:12]+B[31:12]=vaddr[31:12] \tag{1}$$

Where: A[31:12] is the base_addr[31:12] and B[31:12] is addr_offset[31:12].

Equation (1) may be expressed in 2's complement values as:

$$A[31:12]+B[31:12]+\sim vaddr[31:12]=-1=\text{hex}FFFFF \tag{2}$$

Figure 8:
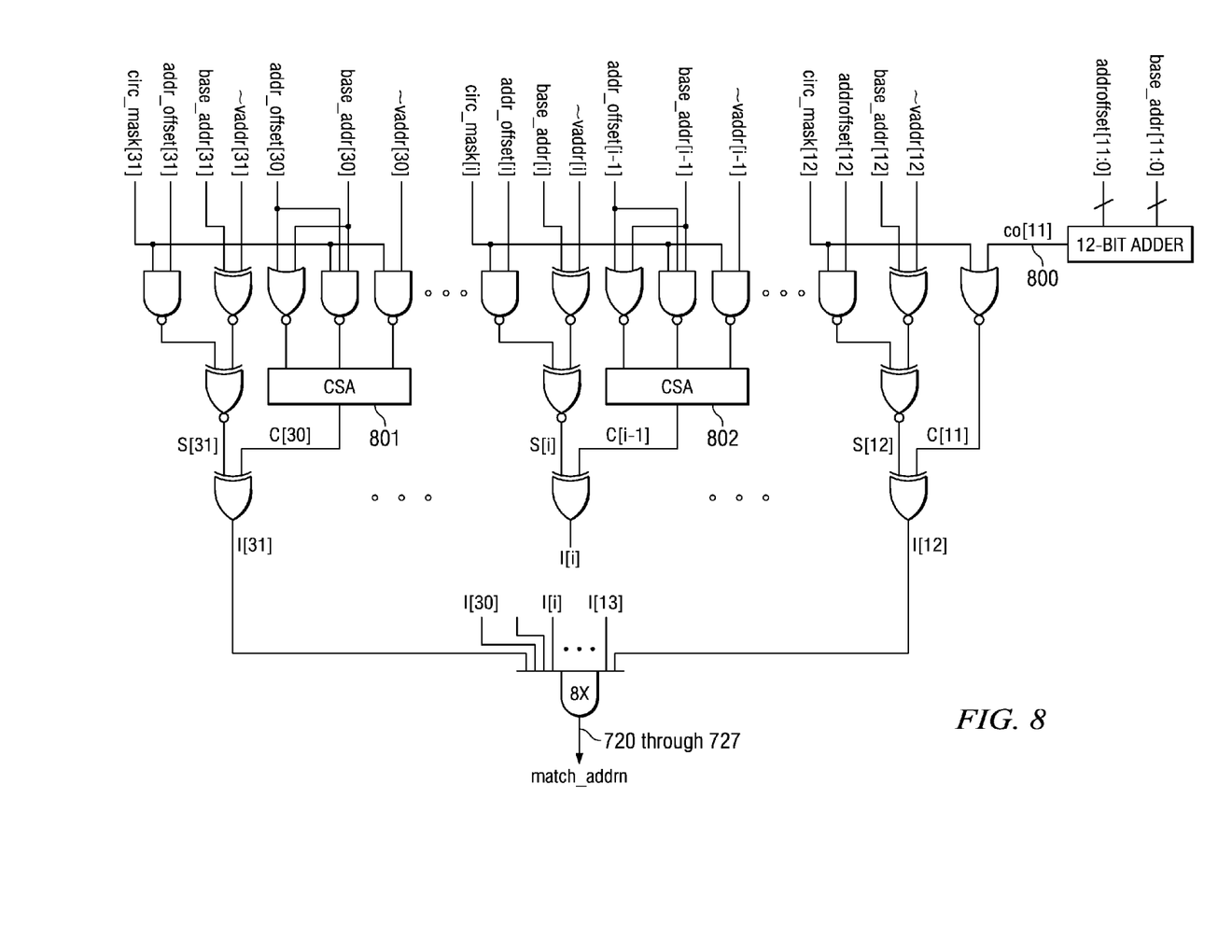
FIG. 8 illustrates the hardware implementation, of the fast compare unit of the modified arithmetic functional unit of FIG. 6 showing the critical path is from $11^{th}$ carry out bits to match signal path.

This match condition can be implemented by using carry save adder (CSA) logic. According to carry save logic a sum S and a carry C are expressed as:

$$S[31:12] = A[31:12] \oplus B[31:12] \oplus vaddr[31:12] \tag{3}$$

$$C[30:12] = A[30:12] \cdot B[30:12] + \\ A[30:12] \cdot \sim vaddr[30:12] + B[30:12] \cdot \sim vaddr[30:12] \tag{4}$$

where: $\oplus$ denotes an exclusive OR operation; and • denotes an AND operation. These sum term and carry term can be conditioned to circular addressing by masking the offset address with circ_mask[30:12]:

$$S[31:12] = A[31:12] \oplus (CM[31:12] \cdot B[31:12]) \oplus vaddr[31:12] \tag{5}$$

$$C[30:12] = A[30:12] \cdot (CM[30:12] \cdot B[30:12]) + \\ A[30:12] \cdot \sim vaddr[30:12] + (CM[30:12] \cdot B[30:12]) \cdot \sim vaddr[30:12] \tag{6}$$

where: CM[31:12] is circ_mask[30:12]. Concluding the match operation:

if $S[31:12] \oplus \{C[30:12], cin[11]\} == \text{hex}FFFFF$ (5)

if $S[31:12] \oplus \{C[30:12], co[11]\} == \text{hex}FFFFF$ (7)

then $A[31:12]+B[31:12]=\text{vaddr}$; a match else $A[31:12]+B[31:12]!=\text{vaddr}$; no match FIG. 8 illustrates the hardware implementation. The critical path 800 is from the eleventh carry out bit to the match signal path. Blocks 801 and 803 are carry save adders. With the full address/compare circuit combined at the top level, the new D unit of FIG. 6 includes eight TLB compare elements forming address comparison unit 609. These TLB compare elements are implemented according to FIG. 8.

Figure 9:
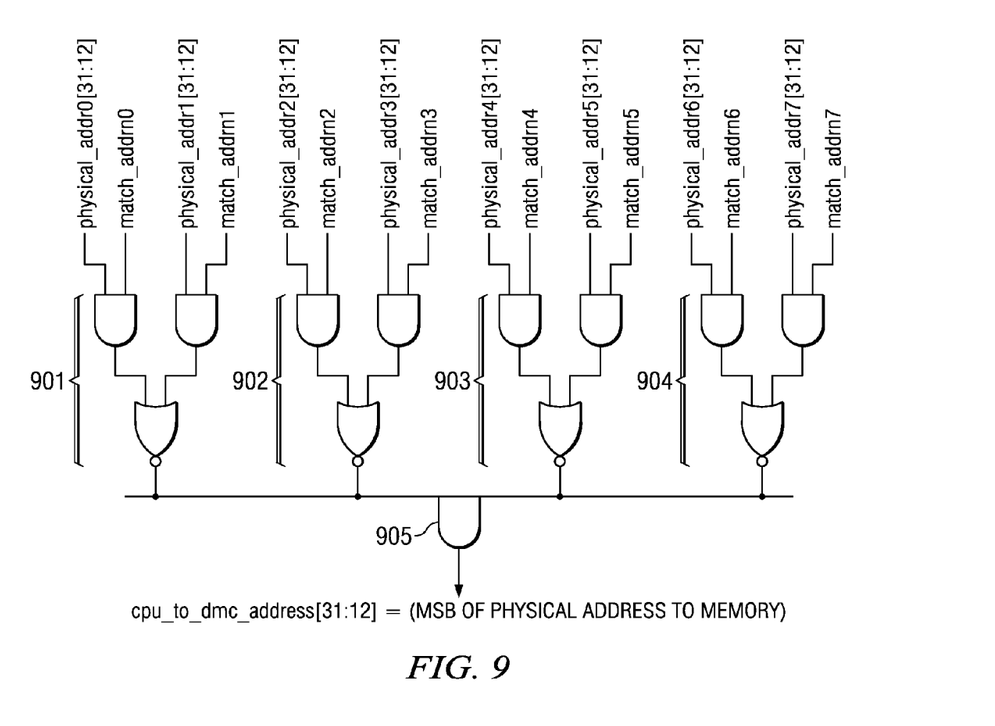
FIG. 9 illustrates the TLB AND_OR output stage of the fast compare unit of FIG. 6.

FIG. 9 illustrates the TLB output multiplexer block 730 of FIG. 7. AND-NOR circuits 901 through 904 are used to route the eight 20-bit physical_address[0:7] to the circuit output AND gate 905. Only one of the signals match_addrn[0 . . . 7] 720 through 727 will be in a true state, directing one selected 20-bit physical_address[0 . . . 7][31:12] to the output of the address comparison circuit 731. Thus the TLB output multiplexer block 730 acts as a wide multiplexer with output selected by the match_addrn[0 . . . 7] signals 720 through 727.

What is claimed is:

1. An address translator comprising:
   a base address register storing a base address;
   an offset register storing an offset address;
   a circular mask register storing data corresponding to a circular address range;
   a table look-aside buffer table storing a plurality of entries each consisting of a physical address and a corresponding virtual address;
   a plurality of virtual address comparators, one virtual address comparator corresponding to each entry of said table look-aside buffer, connected to said base address register, said offset register, said circular mask register and said table look-aside buffer table, each virtual address comparator comparing M most significant bits and including
      M−1 most significant bit circuits, an (i)th most significant bit circuit including
         a first NAND gate having a first input receiving an (i)th bit of said circular mask register, a second input receiving an (i)th bit of said offset address and an output,
         a first exclusive NOR gate having a first input receiving an (i) th bit of said base address, a second input receiving an inverse of an (i)th bit of said corresponding virtual address and an output, a second exclusive NOR gate having a first input connected to said output of said first NAND gate,
         a second input connected to said output of said first exclusive NOR gate and an output,
         a NOR gate having a first input receiving an (i−1)th bit of said offset address, a second input receiving an (i−1)th bit of said base address and an output,
         a second NAND gate having a first input receiving said (i)th bit of said circular mask register, a second input receiving an (i−1)th bit of said offset address, a third input receiving an (i−1)th bit of said base address and an output,
         a third NAND gate having a first input receiving said (i)th bit of said circular mask register, a second input receiving an inverse of (i−1)th bit of said corresponding virtual address and an output,
         a one bit carry save adder circuit having a first input connected to said output of said NOR gate, a second input connected to said output of said second NAND gate, a third input connected to said output of said third NAND gate and an output generating a carry signal of an (i−1)th bit, and
         an exclusive OR circuit having a first input connected to said output of said second exclusive NOR gate, a second input connected to said output of said one bit carry save adder circuit and an output,
      a least significant bit circuit comparing a (T−M)th bit, where T is the number of bits of said base address and said offset address, and including
         a first NAND gate having a first input receiving a (T−M)th bit of said circular mask register, a second input receiving a (T−M)th bit of said offset address and an output,
         an first exclusive NOR gate having a first input receiving a (T−M)th bit of said base address, a second input receiving an inverse of a (T−M)th bit of said corresponding virtual address and an output, a second exclusive NOR gate having a first input connected to said output of said first NAND gate, a second input connected to said output of said first exclusive NOR gate and an output,
         a NOR gate having a first input receiving a (T−M)th bit of said offset address, a second input receiving a (M−1)th bit carry of a sum of said base address and said offset and an output,
         an exclusive OR circuit having a first input connected to said output of said second exclusive NOR gate, a second input connected to said output of said NOR gate, and
      an M input AND gate having said M inputs connected to said output of said exclusive OR gate of said M−1 most significant bit circuits and said exclusive OR gate of said least significant bit circuit and a match output; and
   an output multiplexer connected to said a table look-aside buffer table and said plurality of virtual address comparators, said output multiplexer outputting a physical address corresponding to a match output from said plurality of virtual address comparators.

2. The address translator of claim 1, further comprising:
   an adder having a first input connected to said base address register to receive said base address, a second input connected to said offset address register to receive said offset address and an output generating a sum of said first input and said second input, said adder including
      a most significant bit adder having a first input receiving M most significant bits of said base address, a second input M most significant bits of receiving said offset address and an output, and
      a least significant bit adder having a first input receiving T-M most significant bits of said base address, a second input T-M most significant bits of receiving said offset address and a sum output and a carry output from a most significant bit of said least significant bit adder connected to said second input of said NOR gate of said least significant bit circuit.

3. The address translator of claim 1 wherein:
   T is 32 bits; and
   M is 20 bits.

4. A method of address translation of a virtual address consisting of a sum of a base address and an offset address into a physical address comprising the steps of:
   storing in a table a set of virtual address and corresponding physical addresses;

forming a bit wise sum term S[i] for a predetermined set of M most significant bits for each stored virtual address as follows:

$$S[i]=A[i]\oplus B[i]\oplus vaddr[i]$$

where: S[i] is the (i)th bit of the sum term; A[i] is the (i)th bit of the base address; B[i] is the (i)th bit of the offset address; vaddr[i] is the (i)th bit of the corresponding stored virtual address; and $\oplus$ denotes an exclusive OR operation;

forming a bit wise carry term C[i−1] for said predetermined set of M most significant bits for each stored virtual address as follows:

$$C[i-1]=A[i] \bullet B[i]+A[i] \bullet \sim vaddr[i]+B[i] \bullet \sim vaddr[i]$$

where: C[i−1] is the (i−1)th bit of the carry term; ~vaddr[i] is the bit inverse of the (i)th bit of the corresponding virtual address and • denotes an AND operation;

forming a carry output co[N] from the sum of least significant bits of said base address and least significant bits of said offset address;

forming a combined sum term and carry term as follows:

$$S[i]\oplus C[i-1]$$

for all but a least significant bit of said predetermined set of most significant bits, and $$S[i]\oplus co[N]$$

for said least significant of said predetermined set most significant bits;

determining a match for a stored virtual address if all bits of said combined sum term and carry term for that stored virtual address 1's; and selecting a stored physical address for output of said address translation if a corresponding stored virtual address generates a match.

5. The method of address translation of claim 4, further comprising:

forming a circular addressing mask having 1's in least significant bits within a circular address range and 0's in most significant bits above said circular address range;

before forming said bitwise sum term and said bitwise carry term, bitwise ANDing said offset address and said circular addressing mask.

* * * * *